US010877730B2

(12) United States Patent
Bajekal et al.

(10) Patent No.: US 10,877,730 B2
(45) Date of Patent: Dec. 29, 2020

(54) PRESERVING TEMPORAL RELEVANCE OF CONTENT WITHIN A CORPUS

(71) Applicant: International Business Machines Corporation, Armonk, NY (US)

(72) Inventors: Sadanand R. Bajekal, Austin, TX (US); Lakshminarayanan Krishnamurthy, Round Rock, TX (US); Niyati Parameswaran, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 15/271,540

(22) Filed: Sep. 21, 2016

(65) Prior Publication Data
US 2018/0081627 A1    Mar. 22, 2018

(51) Int. Cl.
*G06F 16/9535* (2019.01)
*G06F 16/48* (2019.01)
*G06F 7/24* (2006.01)

(52) U.S. Cl.
CPC .............. *G06F 7/24* (2013.01); *G06F 16/489* (2019.01); *G06F 16/9535* (2019.01); *G06F 2216/03* (2013.01)

(58) Field of Classification Search
CPC .............. G06F 16/489; G06F 16/9535; G06F 2216/03; G06F 7/24
USPC .................................................. 707/600–899
See application file for complete search history.

(56) References Cited

U.S. PATENT DOCUMENTS

| 7,373,332 | B2 | 5/2008 | Heumann et al. |
| 8,442,923 | B2 | 5/2013 | Gross |
| 8,924,379 | B1 | 12/2014 | Kim et al. |
| 8,954,434 | B2 | 2/2015 | Ahri et al. |
| 9,098,556 | B2 | 8/2015 | Topatan et al. |
| 9,183,849 | B2 | 11/2015 | Neuhauser et al. |
| 9,324,007 | B2 | 4/2016 | Wright et al. |
| 2006/0248073 | A1* | 11/2006 | Jones .................. G06F 16/3328 |

(Continued)

OTHER PUBLICATIONS

List of IBM Patents or Applications Treated as Related.
(Continued)

*Primary Examiner* — Irete F Ehichioya
*Assistant Examiner* — Xiaoqin Hu
(74) *Attorney, Agent, or Firm* — Terrile, Cannatti & Chambers, LLP; Stephen A. Territe

(57) ABSTRACT

A method, system and computer-usable medium are disclosed for preserving temporal relevance of content within a corpus. A corpus is processed to generate temporally-relevant metadata and mined content, which in turn are processed to generate first temporal relevancy metrics. The cache history of a web browser is likewise processed to generate second temporal relevancy metrics, which in turn is processed with the first temporal relevancy metrics to generate first temporal relevancy scores. New documents are ingested into the corpus and existing documents are revised. Temporally-relevant metadata and mined content associated with the updated corpus are then processed to generate third temporal relevancy metrics. The second and third temporal relevancy metrics are then processed to generate second temporal relevancy scores, which is then used to provide a temporally-relevant response to a query.

14 Claims, 6 Drawing Sheets

(56) References Cited

U.S. PATENT DOCUMENTS

| | | | |
|---|---|---|---|
| 2009/0049018 A1* | 2/2009 | Gross | G06Q 30/00 |
| 2010/0325131 A1* | 12/2010 | Dumais | G06F 16/9535 |
| | | | 707/759 |
| 2014/0006328 A1* | 1/2014 | Blanco | G06F 16/9537 |
| | | | 706/46 |
| 2015/0227591 A1* | 8/2015 | Jose | G06F 16/285 |
| | | | 707/777 |
| 2015/0356170 A1 | 12/2015 | Allen et al. | |
| 2015/0356179 A1* | 12/2015 | Zhukovskii | G06F 16/951 |
| | | | 707/751 |
| 2016/0132590 A1 | 5/2016 | Byron et al. | |

OTHER PUBLICATIONS

High, R., "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

PRESERVING TEMPORAL RELEVANCE OF CONTENT WITHIN A CORPUS

BACKGROUND OF THE INVENTION

Field of the Invention

The present invention relates in general to the field of computers and similar technologies, and in particular to software utilized in this field. Still more particularly, it relates to a method, system and computer-usable medium for preserving temporal relevance of content within a corpus.

Description of the Related Art

In general, the credibility and worthiness of information returned by a question-answer (QA) system in response to a query is based upon its relevance, accuracy, objectivity, coverage, and timeliness. However, preserving the timeliness, or temporal relevance, of content within a corpus can prove challenging as information that may have been current a short time ago may now be out of date and of little value to the user. Examples of outdated information include data related to past weather forecasts, invalid predictions related to a company's financial performance, or anticipated expectations of events that have already occurred.

One potential cause of temporal irrelevance is the static nature of content once it has been ingested by a QA system, as it usually remains unchanged until the corpus is either rebuilt or updated. Such processes typically include incrementally adding new files, or pruning existing files, both of which generally require human interaction to keep track of changes to the corpus content. As a result, it is not uncommon for certain corpus content to become stale, which in turn may cause the QA system's cognitive reasoning algorithms, such as those used for evidence scoring, to return temporally-irrelevant answers.

Approaches to addressing this issue include attempting to exploit temporal information that may exist in the user query. Such approaches typically filter out otherwise relevant responses whose associated dates or time are not within the queried time interval. However, not all user queries explicitly state a time interval. Instead, a temporally-relevant time interval may be implied, such as "this coming weekend" or "next month," which can introduce ambiguity as to which responses are relevant and which are not. Other approaches include using temporal data stored in a web browser's cache history or temporally-related metadata associated with content within a corpus. However, these approaches fail to accommodate content that is temporally dynamic when responding to a query.

SUMMARY OF THE INVENTION

A method, system and computer-usable medium are disclosed for preserving temporal relevance of content within a corpus. In various embodiments, a corpus is processed to generate temporally-relevant metadata and mined content associated with the documents it contains. The metadata and mined content is then processed to generate first temporal relevancy metrics. The cache history of a web browser is then likewise processed to generate second temporal relevancy metrics. In turn, the first and second temporal relevancy metrics are processed to generate first temporal relevancy ranking scores for the documents.

In certain documents, new documents are ingested into the corpus and existing documents are revised. Temporally-relevant metadata and mined content associated with the new documents and revisions to existing documents are then processed to generate third temporal relevancy metrics. In turn, the second and third temporal relevancy metrics are processed to generate second temporal relevancy ranking scores for the documents.

In various embodiments, the second temporal relevancy scores are then used to provide a temporally-relevant response to a query. In these embodiments, the response includes temporal feature corresponding to a temporal feature in the query. In certain embodiments, the mined content may include explicit temporal features, implicit temporal features, user context and preferences, content management processes, or any combination thereof. In various embodiments, the processing of the second and third temporal relevancy metrics may include applying differential weighting to individual terms within the corpus according to their associated temporal features.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
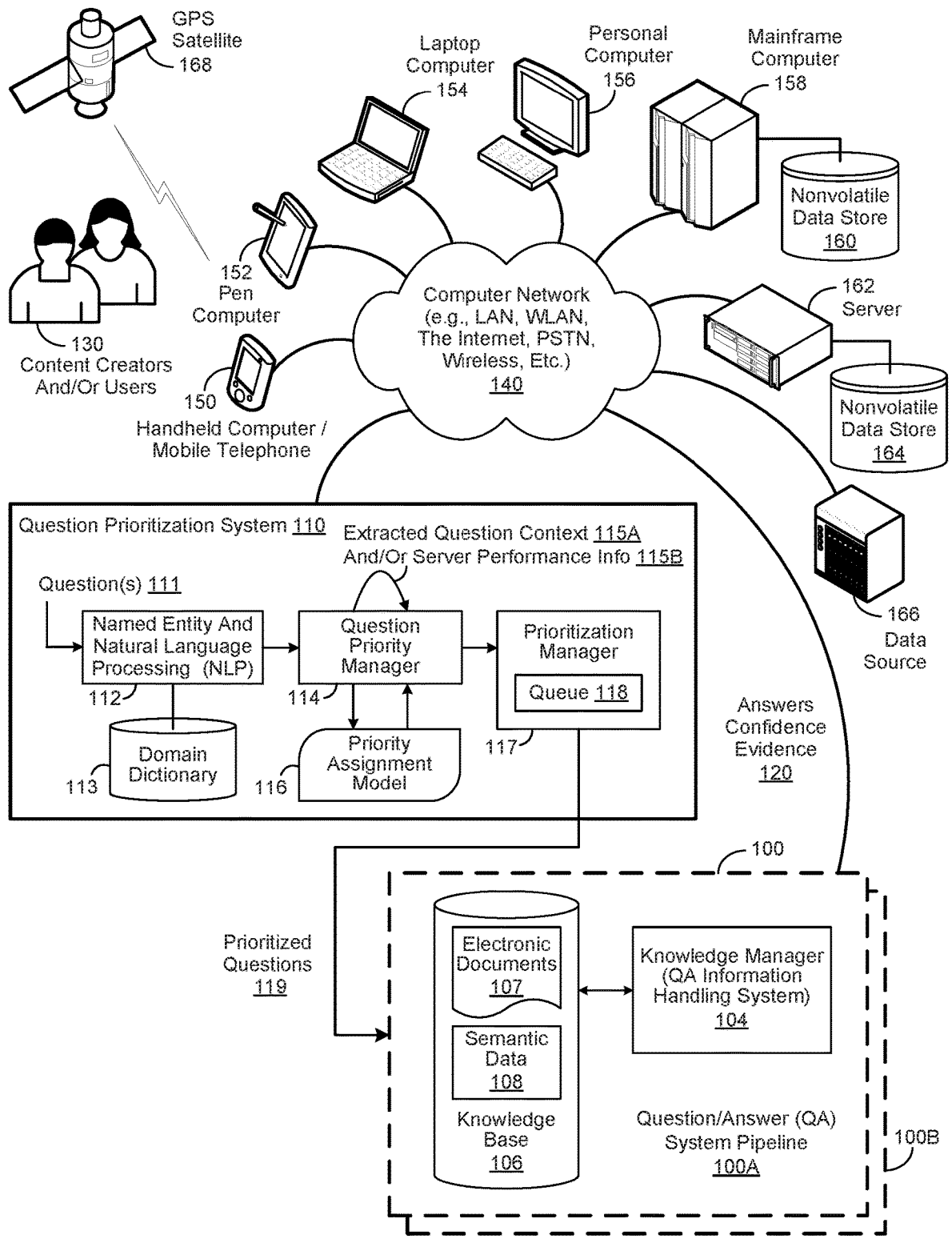
FIG. 1 depicts an exemplary client computer in which the present invention may be implemented.

A method, system and computer-usable medium are disclosed for preserving temporal relevance of content within a corpus. The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium, or media, having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer, or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 and a question prioritization system 110 connected to a computer network 140. The QA system 100 includes a knowledge manager 104 that is connected to a knowledge base 106 and configured to provide question/answer (QA) generation functionality for one or more content creators and/or users 130 who submit across the network 140 to the QA system 100. To assist with efficient sorting and presentation of questions to the QA system 100, the question prioritization system 110 may be connected to the computer network 140 to receive user questions, and may include a plurality of subsystems which interact with cognitive systems, like the QA system 100, to prioritize questions or requests being submitted to the QA system 100.

The Named Entity subsystem 112 receives and processes each question 111 by using natural language processing (NLP) to analyze each question and extract question topic information contained in the question, such as named entities, phrases, urgent terms, and/or other specified terms which are stored in one or more domain entity dictionaries 113. By leveraging a plurality of pluggable domain dictionaries 113 relating to different domains or areas (e.g., travel, healthcare, electronics, game shows, financial services, etc.), the domain dictionary 113 enables critical and urgent words (e.g., "threat level") from different domains (e.g., "travel") to be identified in each question based on their presence in the domain dictionary 113. To this end, the Named Entity subsystem 112 may use an NLP routine to identify the question topic information in each question. As used herein, "NLP" broadly refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 113.

The Question Priority Manager subsystem 114 performs additional processing on each question to extract question context information 115A. In addition, or in the alternative, the Question Priority Manager subsystem 114 may also extract server performance information 115B for the question prioritization system 110 and/or QA system 100. In selected embodiments, the extracted question context information 115A may include data that identifies the user context and location when the question was submitted or received. For example, the extracted question context information 115A may include data that identifies the user who submitted the question (e.g., through login credentials), the device or computer which sent the question, the channel over which the question was submitted, or any combination thereof. Other examples may include the location of the user or device that sent the question, any special interest location indicator (e.g., hospital, public-safety answering point, etc.), other context-related data for the question, or any combination thereof. In certain embodiments, the location information is determined through the use of a Geographical Positioning System (GPS) satellite 168. In these embodiments, a handheld computer or mobile telephone 150, or other device, uses signals transmitted by the GPS satellite 168 to generate location information, which in turn is provided via the computer network 140 to the Question Priority Manager subsystem 114 for processing.

In various embodiments, the source for the extracted context information 115A may be a data source 166 accessed through the computer network 140. Examples of a data source 166 include systems that provide telemetry information, such as medical information collected from medical equipment used to monitor a patient's health, environment information collected from a facilities management system, or traffic flow information collected from a transportation monitoring system. In certain embodiments, the data source 166 may be a storage area network (SAN) or other network-based repositories of data.

In various embodiments, the data source 166 may provide data directly or indirectly collected from "big data" sources. In general, big data refers to a collection of data (i.e., datasets) so large and complex that traditional database management tools and data processing approaches are inadequate. These datasets can originate from a wide variety of sources, including computer systems (e.g., 156, 158, 162), mobile devices (e.g., 150, 152, 154), financial transactions, streaming media, social media, as well as systems (e.g., 166) commonly associated with a wide variety of facilities and infrastructure (e.g., buildings, factories, transportation systems, power grids, pipelines, etc.). Big data, which is typically a combination of structured, unstructured, and semi-structured data poses multiple challenges, including its capture, curation, storage, transfer, search, querying, sharing, analysis and visualization.

The Question Priority Manager subsystem 114 may also determine or extract selected server performance data 115B for the processing of each question. In certain embodiments, the server performance information 115B may include operational metric data relating to the available processing resources at the question prioritization system 110 and/or QA system 100, such as operational or run-time data, CPU utilization data, available disk space data, bandwidth utilization data, and so forth. As part of the extracted information 1I 15A/B, the Question Priority Manager subsystem 114 may identify the Service Level Agreement (SLA) or Quality of Service (QoS) processing requirements that apply to the question being analyzed, the history of analysis and feedback for the question or submitting user, and the like. Using the question topic information and extracted question context 115A and/or server performance information 115B, the Question Priority Manager subsystem 114 is configured to populate feature values for the Priority Assignment Model 116. In various embodiments, the Priority Assignment Model 116 provides a machine learning predictive model for generating target priority values for the question, such as by using an artificial intelligence (AI) approaches known to those of skill in the art. In certain embodiments, the AI logic is used to determine and assign a question urgency value to each question for purposes of prioritizing the response processing of each question by the QA system 100.

The Prioritization Manager subsystem 117 performs additional sort or rank processing to organize the received questions based on at least the associated target priority values such that high priority questions are put to the front of a prioritized question queue 118 for output as prioritized questions 119. In the question queue 118 of the Prioritization Manager subsystem 117, the highest priority question is placed at the front of the queue for delivery to the assigned QA system 100. In selected embodiments, the prioritized questions 119 from the Prioritization Manager subsystem 117 that have a specified target priority value may be assigned to a particular pipeline (e.g., QA system pipeline 100A, 100B) in the QA system 100. As will be appreciated, the Prioritization Manager subsystem 117 may use the question queue 118 as a message queue to provide an asynchronous communications protocol for delivering prioritized questions 119 to the QA system 100. Consequently, the Prioritization Manager subsystem 117 and QA system 100 do not need to interact with a question queue 118 at the same time by storing prioritized questions in the question queue 118 until the QA system 100 retrieves them. In this way, a wider asynchronous network supports the passing of prioritized questions 119 as messages between different QA system pipelines 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 117 may be configured to convert oversubscribing questions into asynchronous responses, even if they were asked in a synchronized fashion.

The QA system 100 may include one or more QA system pipelines 100A, 100B, each of which includes a computing device 104 comprising one or more processors and one or more memories. The QA system pipelines 100A, 100B may likewise include potentially any other computing device elements generally known in the art including buses, storage devices, communication interfaces, and the like. In various embodiments, these computing device elements may be implemented to process questions received over the network 140 from one or more content creator and/or users 130 at computing devices (e.g., 150, 152, 154, 156, 158, 162). In certain embodiments, the one or more content creator and/or users 130 are connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users 130. Other embodiments of QA system 100 may be used with components, systems, sub-systems, and/or devices other than those that are depicted herein.

In each QA system pipeline 100A, 100B, a prioritized question 119 is received and prioritized for processing to generate an answer 120. In sequence, prioritized questions 119 are de-queued from the shared question queue 118, from which they are de-queued by the pipeline instances for processing in priority order rather than insertion order. In selected embodiments, the question queue 118 may be implemented based on a "priority heap" data structure. During processing within a QA system pipeline (e.g., 100A, 100B), questions may be split into multiple subtasks, which run concurrently. In various embodiments, a single pipeline instance may process a number of questions concurrently, but only a certain number of subtasks. In addition, each QA system pipeline 100A, 100B may include a prioritized queue (not shown) to manage the processing order of these subtasks, with the top-level priority corresponding to the time that the corresponding question started (i.e., earliest has highest priority). However, it will be appreciated that such internal prioritization within each QA system pipeline 100A, 100B may be augmented by the external target priority values generated for each question by the Question Priority Manager subsystem 114 to take precedence, or ranking priority, over the question start time. In this way, more important or higher priority questions can "fast track" through a QA system pipeline 100A, 100B if it is busy with already-running questions.

In the QA system 100, the knowledge manager 104 may be configured to receive inputs from various sources. For example, knowledge manager 104 may receive input from the question prioritization system 110, network 140, a knowledge base or corpus of electronic documents 107 or other data, semantic data 108, content creators, and/or users 130, and other possible sources of input. In selected embodiments, some or all of the inputs to knowledge manager 104 may be routed through the network 140 and/or the question prioritization system 110. The various computing devices (e.g., 150, 152, 154, 156, 158, 162) on the network 140 may include access points for content creators and/or users 130. Some of the computing devices may include devices for a database storing a corpus of data as the body of information used by the knowledge manager 104 to generate answers to cases. The network 140 may include local network connections and remote connections in various embodiments, such that knowledge manager 104 may operate in environments of any size, including local (e.g., a LAN) and global (e.g., the Internet). Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, a content creator 130 creates content (e.g., a document) in a knowledge base 106 for use as part of a corpus of data used in conjunction with knowledge manager 104. In selected embodiments, the knowledge base 106 may include any file, text, article, or source of data (e.g., scholarly articles, dictionary definitions, encyclopedia references, and the like) for use by the knowledge manager 104. Content users 130 may access the knowledge manager 104 via a network connection or an Internet connection to the network 140, and may input questions to the knowledge manager 104 that may be answered by the content in the corpus of data.

As further described below, when a process evaluates a given section of a document for semantic content, the process can use a variety of conventions to query it from the knowledge manager 104. One convention is to send a well-formed question. As used herein, semantic content broadly refers to content based upon the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager 104. In various embodiments, the knowledge manager 104 may interpret the question and provide a response to the content user containing one or more answers to the question. In some embodiments, the knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 119 and the language used in each of the portions of the corpus of data found during the application of the queries using a variety of reasoning algorithms. There may be hundreds or even thousands of reasoning algorithms applied, each of which performs different analysis (e.g., comparisons), and generates a score. For example, certain reasoning algorithms may look at the matching of terms and synonyms within the language of the input question and the found portions of the corpus of data. Other reasoning algorithms may look at temporal or spatial features in the language, while yet others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 120 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 150 to large mainframe systems, such as mainframe computer 158. Examples of handheld computer 150 include personal digital assistants (PDAs), personal entertainment devices, such as MP3 players, portable televisions, and compact disc players. Other examples of information processing systems include pen, or tablet, computer 152, laptop, or notebook, computer 154, personal computer system 156, server 162, and mainframe computer 158.

As shown, the various information processing systems can be networked together using computer network 140. Types of computer network 140 that can be used to interconnect the various information processing systems include Personal Area Networks (PANs), Local Area Networks (LANs), Wireless Local Area Networks (WLANs), the Internet, the Public Switched Telephone Network (PSTN), other wireless networks, and any other network topology that can be used to interconnect the information processing systems.

Figure 2:
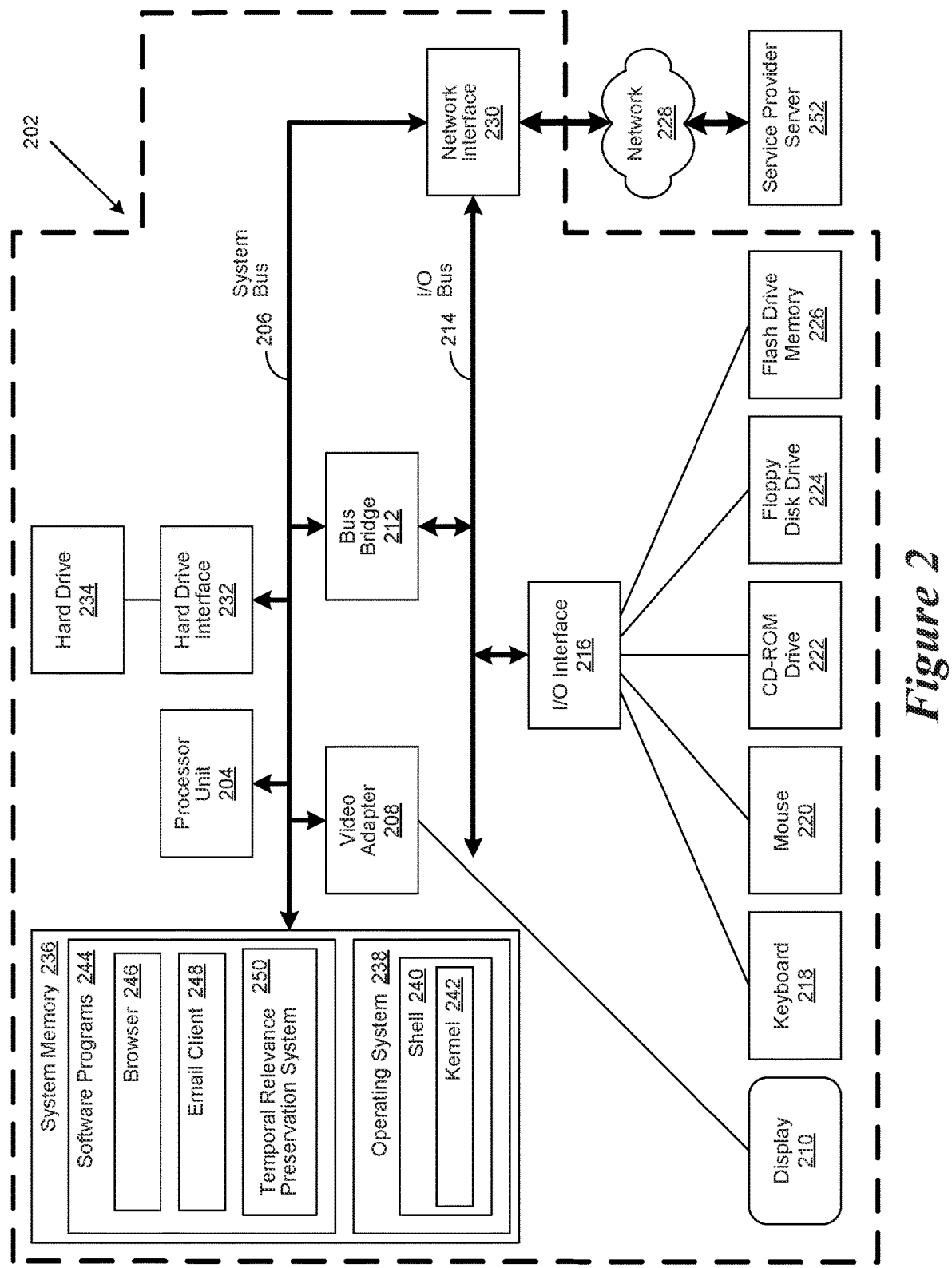
FIG. 2 is a simplified block diagram of an information handling system capable of performing computing operations.

In selected embodiments, the information processing systems include nonvolatile data stores, such as hard drives and/or nonvolatile memory. Some of the information processing systems may use separate nonvolatile data stores. For example, server 162 utilizes nonvolatile data store 164, and mainframe computer 158 utilizes nonvolatile data store 160. The nonvolatile data store can be a component that is external to the various information processing systems or can be internal to one of the information processing systems. An illustrative example of an information processing system showing an exemplary processor and various components commonly accessed by the processor is shown in FIG. 2.

In various embodiments, the QA system 100 is implemented to receive a variety of data from various computing devices (e.g., 150, 152, 154, 156, 158, 162) and data sources 166, which in turn is used to perform QA operations described in greater detail herein. In certain embodiments, the QA system 100 may receive a first set of information from a first computing device (e.g., laptop computer 154), The QA system 100 then uses the first set of data to perform QA processing operations resulting in the generation of a second set of data, which in turn is provided to a second computing device (e.g., server 162). In response, the second computing device may process the second set of data to generate a third set of data, which is then provided back to the QA system 100. In turn, the QA system may perform additional QA processing operations on the third set of data to generate a fourth set of data, which is then provided to the first computing device.

In certain embodiments, a first computing device (e.g., server 162) may receive a first set of data from the QA system 100, which is then processed and provided as a second set of data to another computing device (e.g., mainframe 158). The second set of data is processed by the second computing device to generate a third set of data, which is provided back to the first computing device. The second computing device then processes the third set of data to generate a fourth set of data, which is then provided to the QA system 100, where it is used to perform QA operations described in greater detail herein.

In one embodiment, the QA system may receive a first set of data from a first computing device (e.g., handheld computer/mobile device 150), which is then used to perform QA operations resulting in a second set of data. The second set of data is then provided back to the first computing device, where it is used to generate a third set of data. In turn, the third set of data is provided back to the QA system 100, which then provides it to a second computing device (e.g., mainframe computer 158), where it is used to perform post processing operations.

As an example, a content user 130 may ask the question, "I'm looking for a good pizza restaurant nearby." In response, the QA system 100 may provide a list of three such restaurants in a half mile radius of the content user. In turn, the content user 130 may then select one of the recommended restaurants and ask for directions, signifying their intent to proceed to the selected restaurant. In this example, the list of recommended restaurants, and the restaurant the content user 130 selected, would be the third set of data provided to the QA system 100. To continue the example, the QA system 100 may then provide the third set of data to the second computing device, where it would be processed to generate a database of the most popular restaurants, by classification, location, and other criteria.

In various embodiments the exchange of data between various computing devices (e.g., 150, 152, 154, 156, 158, 162) results in more efficient processing of data as each of the computing devices can be optimized for the types of data it processes. Likewise, the most appropriate data for a particular purpose can be sourced from the most suitable computing device (e.g., 150, 152, 154, 156, 158, 162), or data source 166, thereby increasing processing efficiency. Skilled practitioners of the art will realize that many such embodiments are possible and that the foregoing is not intended to limit the spirit, scope or intent of the invention.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a temporal relevance preservation system 250. In these and other embodiments, the temporal relevance preservation system 250 includes code for implementing the processes described hereinbelow. In one embodiment, the information processing system 202 is able to download the temporal relevance preservation system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
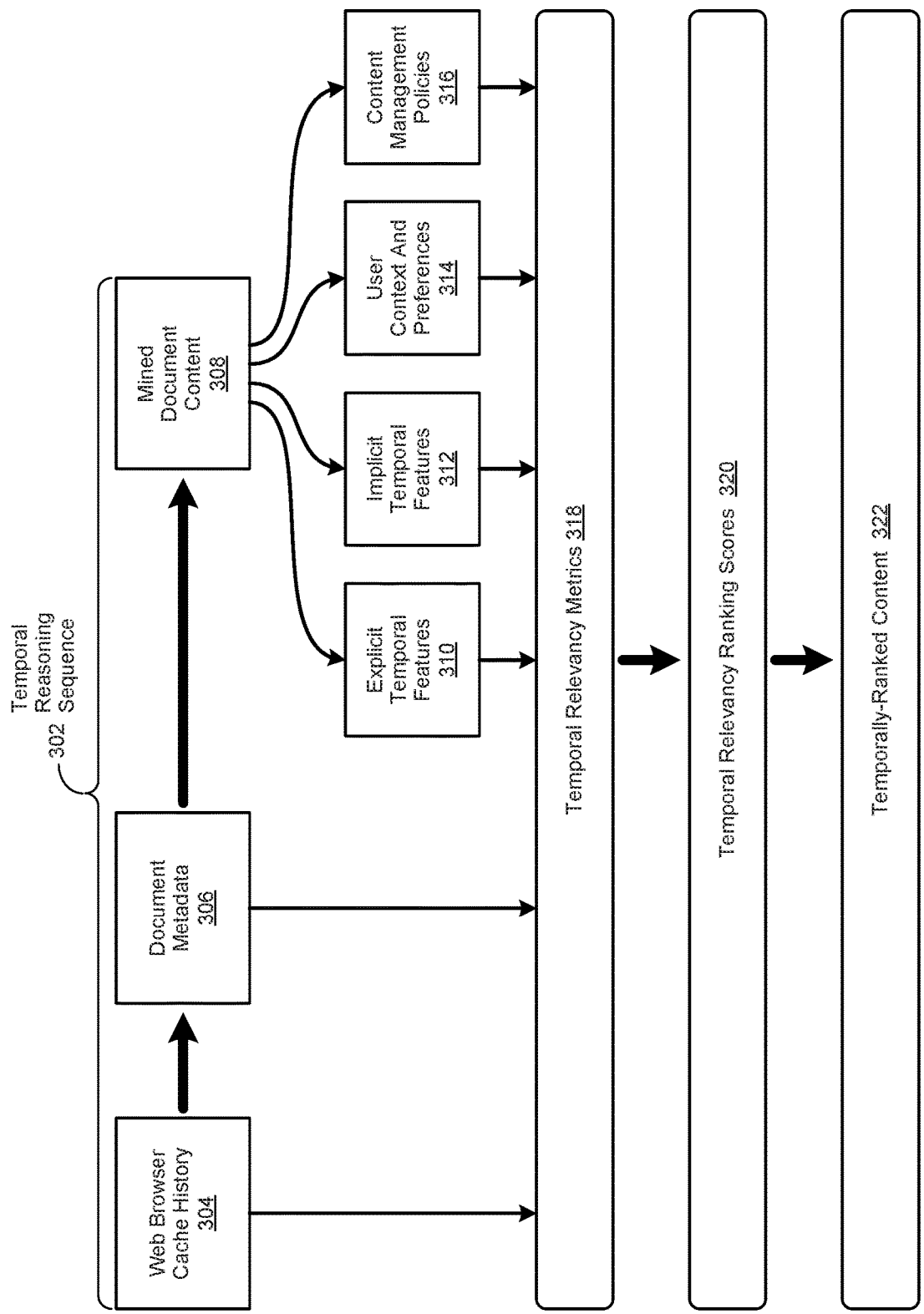
FIG. 3 is a simplified process flow diagram depicting a temporal reasoning sequence.

FIG. 3 is a simplified process flow diagram depicting a temporal reasoning sequence implemented in accordance with an embodiment of the invention. In various embodiments, a temporal relevance preservation system is implemented in combination with a question-answer (QA) system to render temporally-relevant answers by making inferences not just from relevant keywords within a corpus, but from relevant temporal features referenced therein as well. Skilled practitioners of the art will be aware that temporal relevance is generally defined as a measure of importance assigned to an aspect of time, characterized by the smallest unit of temporal granularity that is acceptable or relevant to a particular condition, context or event. As used herein, temporal relevance broadly refers to a measure of how granularly a temporal feature of an answer provided by a QA system matches a corresponding temporal feature of an associated query received by the QA system.

In certain embodiments, the temporal feature may be explicit or implicit, such as an explicit date (e.g., Apr. 14, 2016), an implicit date (e.g., Labor Day, without specification of a particular year), an explicit range of dates (e.g., Oct. 14-17, 2014), an implicit range of dates (e.g., before the end of Q4, without specifying which year), an explicit season (e.g., Summer, which consists of the months June through August in North America), or an implicit season (e.g., the Winter holidays, which may or may not include Thanksgiving, Christmas, and New Year's Day, depending upon location and culture). In various embodiments, the explicit or implicit temporal feature may be an explicitly-stated time (e.g., 12:42:30 PM), an implicitly-stated time (e.g., before noon), an explicit range of time (e.g., between 8:30 AM and 1:30 PM), an implicit range of time (e.g., after lunch, but before dinner), or a duration of time (e.g., the Pleistocene epoch, 43 milliseconds, etc.). As likewise used herein, in the context of temporal relevance, "preservation" broadly refers to preserving, at a contextually granular level, the relevance between a particular temporal feature of an answer provided by a QA system in response to an associated query that includes a corresponding temporal feature.

For example, a travel-related query submitted to a QA system may ask, "I'm traveling to New York in two weeks. What's playing on Broadway?" In response, the QA system may provide information related to performances scheduled for the months of September and October. In this example, the response provided by the QA system will be valid so long as the question is asked prior to the time frame associated with the information provided in the response. However, if the same question was submitted in October, then the information provided in the original response associated with performances scheduled for September would be irrelevant and of little value to the user as they would now be in the past. Furthermore, information related to performances originally scheduled for October may no longer be valid, as their schedules may have changed.

To continue the example, the granularity of the temporal feature of the query is one week, as it states "I'm traveling to New York in two weeks." Consequently, the travel to New York would take place in more than one week, but in less than three weeks, from the date the query was submitted. Accordingly, the QA system would preserve temporal relevancy by providing answers related to performances on Broadways that are scheduled within a two week period beginning after one week, but no later than three weeks, from the date of the query. Those of skill in the art will recognize that many such embodiments and examples of preserving temporal relevance are possible. Accordingly, the foregoing is not intended to limit the spirit, scope or intent of the invention.

Skilled practitioners of the art will also be aware that current QA system approaches to document search and retrieval within a corpus typically rely upon a static document view, with only a single version of the document existing within the index at any given point in time. As used herein, a document broadly refers to a collection of content elements. Examples of such content elements include unstructured data (e.g., a text, semi-structured data (e.g., a body of text separated by descriptive headings), streaming data (e.g., newswire reports), or a collection of web pages, which may include unstructured, semi-structured, and structured data (e.g., a table of data). In various embodiments, the corpus is refreshed as new content is ingested, such that newly-relevant information can be used to provide users with answers that are valid and accurate at the time their associated queries are made. In these embodiments, the temporal relevancy of certain content within the corpus is automatically preserved through the implementation of a statistical machine learning approach that incorporates a temporal feature to corpus ingestion, ranking and retrieval.

In certain embodiments, differential weighting is applied to various terms within the corpus, based upon their associated temporal features. In these embodiments, the differential weighting is used in the performance of temporal relevance ranking operations, described in greater detail herein. In various embodiments, the dynamic effect of newly-ingested content upon the corpus is reflected through the implementation of a probabilistic document ranking approach to generate a temporal ranking score for a given content element within the corpus. In certain of these embodiments, temporal relevancy ranking scores may be generated for newly-ingested content elements and the temporal relevancy ranking scores associated with previously-ingested content may be revised to reflect their respective temporal relevance.

In one embodiment, the implementation of the probabilistic ranking approach includes identifying an explicit or implicit temporal feature of a content element that is temporally-relevant to an associated query. In another embodiment, the implementation of the probabilistic ranking approach includes assigning a temporal relevance score reflecting the strength of correspondence between the amount and frequency of content change within the corpus. In yet another embodiment, the implementation of the probabilistic ranking approach includes advantageously incorporating the dynamic effect of newly-ingested content upon the corpus with known approaches to keyword and temporal index structures to improve retrieval efficacy when rendering answers for a temporally-sensitive search query.

In various embodiments, a hybrid index structure is implemented to index both the textual and temporal features of updated content within a corpus, as well as advantageously use certain features within a query, to provide temporally-relevant answers to an associated query. In certain embodiments, known vector space approaches are built upon to not only index and process queries, but to also rank content elements within a corpus by seamlessly aggregating their respective temporal and textual features. In various embodiments, an update request is automatically generated update certain content if there is a high probabilistic score of it becoming stale. Consequently, implementation of certain embodiments of the invention enable a QA system to better ascertain the temporal relevance of a given content element to an associated query, and by extension, render more temporally-relevant answers.

In various embodiments, a corpus is monitored on an ongoing basis to ascertain the temporal relevance of the content it contains at a particular point in time. In these embodiments, the content within a corpus may be dynamic, both in its quantity and the frequency with which it is updated. In certain of these embodiments, query-relevant and document-relevant change features are analyzed on a periodic basis, the frequency of which is configurable for adaptation to particular features of various information domains. In one embodiment, the query-relevant change feature reflects how terms within a document, especially those that match corresponding terms in a query, change over time. In this embodiment, identifying the static or dynamic nature of words within the query assists in assessing the temporal relevance of various terms within a given document.

Those of skill in the art will be aware of existing approaches for assigning temporal scores to documents retrieved in response to a query. However, such approaches do not differentially weight both static and dynamic content to improve temporal relevancy. As an example, a user may submit a query such as "Which restaurants are open now, are currently playing live music, and serve Ethiopian food?" In this example, the user is looking for restaurants that serve Ethiopian food, which is a static feature, and are open now and currently playing live music, which are dynamic features.

Accordingly, skilled practitioners of the art will recognize the value of differentially weighting both static and dynamic content to render answers that best match the user's expectations. In various embodiments, the differential weighting of static and dynamic content within a document is used to establish a ranked hierarchy of the temporal relevance various content elements, based upon the user's expectations. In certain embodiments, the differential weighting is performed through the use of an algorithm. In these embodiments, the algorithm used, and the method by which it is used, is a matter of design choice.

In various embodiments, a document-relevant change feature is implemented to reflect how frequently, or to what degree, a document changes over time. In certain of these embodiments, the document-relevant change feature is used to determine the freshness of the content within the document. In one embodiment, the document-relevant change feature is implemented to establish a threshold value for initiating self-correcting operations to update the QA system's content store. In another embodiment, the threshold value corresponds to the probability of a document's content being stale. In these embodiments, the value of the threshold, and the method used to perform the self-correcting operations, is a matter of design choice.

Those of skill in the art will be aware that evaluating document dynamics, and associated relevance judgments, may pose certain challenges when using traditional information retrieval approaches. In particular, responding with temporally-relevant answers to queries associated with late-breaking news or newly-created content may be problematic. As an example, documents (e.g., event schedules, weather forecasts, etc.) related to an event such as the $4^{th}$ of July holiday may be subject to frequent changes. Consequently, the dynamic nature of such documents underscores the need to not only collect and aggregate associated queries, but to concurrently make assessments of the temporal relevance of their contents. In certain embodiments, these issues are addressed by the expeditious collection, aggregation and assessment of queries for dynamic, temporally-relevant content.

Referring now to FIG. 3, a temporal reasoning sequence 302 is implemented in various embodiments to generate temporal relevancy metrics 318, which in turn are processed to generate temporal relevancy scores 320 associated with the temporal relevancy of a document. In certain embodiments, the resulting temporal relevancy scores 320 are processed to generate temporally-ranked content 322. In these embodiments, the temporal reasoning sequence 302 includes examination and analysis of a web browser's cache history 304, various document metadata 306, and mined document content 308. Skilled practitioners of the art will be aware that various approaches to digital investigations include examination and analysis of evidence resulting from web browsing activities, as almost every action a user performs leaves a trace, even when searching for information.

This evidence, which is typically retained within a web browser's cache history 304, can often prove useful in timeline analysis, as well for temporal analysis of other features within a document. In various embodiments, analysis of such evidence can be used to optimize certain performance measures of interest, such as hit rate, byte hit rate, and delay savings ratio, which generalizes hit ratio metrics by explicitly considering cache miss costs. In these embodiments, examination and analysis of the contents of a web browser's cache history 304 provides a reference history of documents that have been browsed, in terms of reference frequency and likelihood of being referenced, both of which are pertinent features when determining temporal relevance.

In certain embodiments, document metadata 306 is then examined and analyzed to determine additional information related to the document, such as the date it was created, the date it was last modified, its file size, and so forth. It will be appreciated that such metadata can assist in locating documents that are relevant to temporal features associated with a given query. In various embodiments, document change and associated relevance operations are then performed with the document metadata 306 to generate temporal relevancy metrics 318.

In one embodiment, document change operations are performed to assess the frequency, and the amount of change, in content associated with a document. In certain embodiments, approaches using shingleprinting, cosine similarity, Dice similarity, or some combination thereof, are implemented to perform the document change operations, which in turn generate associated temporal relevance metrics 318. As used herein, shingleprinting, also known as shingling, broadly refers to the use of "shingles" in various document comparison operations to gauge the similarity of two documents. As likewise used herein, "shingles" broadly refer to portions of text, often overlapping, consisting of sequences of tokens. In certain embodiments, the shingles may be overlapping n-grams or some stemmed or stoplisted form thereof.

As likewise used herein, cosine similarity refers to a measure of similarity between two non-zero vectors of an inner product space that measures the cosine of the angle between them. A common use for cosine similarity is in information retrieval and text mining, where it can provide a measure of how similar two documents are likely to be in terms of their respective subject matter. In various known approaches, each term in a document is notionally assigned a different dimension. The document can then be characterized by a vector where the value of each dimension corresponds to the number of times that term appears in the document. The resulting document vector can then be compared to vectors associated with other documents to determine their degree of similarity. Likewise, Dice similarity, also known as a Sorenson-Dice "coefficient," "index" and other names, refers herein to a statistic used for comparing the lexical similarity of two samples, such as two words.

In certain embodiments, shingleprinting is implemented to compute a hash signature for every term window in a document and deterministically sample those individual signatures to compute the signature overlap across subsequent versions of the document. The efficacy of this approach will be recognized by skilled practitioners of the art, as it enables identification of near duplicates and allows for computation of a metric for content change by averaging shingleprint similarity values across all associated temporal features. In various embodiments, document change and associated relevance operations are performed to determine the relationship between changes in a document and its relevance. This relationship is then used to identify documents that are more temporally-relevant, as such documents are not only more likely to change than other documents in general, but also to a greater degree.

Those of skill in the art will recognize that incorporating various temporal features into a search may increase retrieval effectiveness if information related to the creation, publication or modification times of a document is available. However, while such approaches may provide accurate and reliable timestamps of a document, information stored in a web browser's cache history 304 and a document's metadata 306 may not always be accessible. Likewise, the decentralized nature of the web, which can cause a document to be relocated, may also make its metadata unreliable. Consequently, retrieval effectiveness of temporally-relevant information is improved in certain embodiments by performing various operations to examine and analyze mined document content 308. In these embodiments, the method by which the mined document content 308 is obtained from a corpus is a matter of design choice.

In various embodiments, the mined document content 308 is processed to identify explicit temporal features 310, which are in turn processed to generate associated temporal relevancy metrics 318. In these embodiments, the resulting temporal relevancy metrics 318 can assist in establishing the temporal validity of a given document for an associated query. As an example, a document that includes the statement "Sale through May" explicitly states that this content will become stale after May and therefore would require an update thereafter. Similarly, a document stating "Summer Sale" can be correctly, and explicitly, mapped to the time period spanning June through August for locations in the Northern hemisphere. In certain embodiments, such mapping is realized through the implementation of a geo-spatial reasoning engine that takes into account the current season and a particular geographical location.

The mined data content 308 is then processed in various embodiments to identify and analyze implicit temporal features 312, which are in turn processed to generate associated temporal relevancy metrics 318. In these embodiments, the resulting temporal relevancy metrics can assist in establishing the temporal validity of a given document for an associated query. In certain of these embodiments, identification and analysis of the implicit temporal features 312 includes identifying sequential accesses of content associated with a particular document, which provides an indicator of temporal relevancy. As an example, two successive retrievals of a document will indicate that it is likely to still be fresh if the object or objects referenced therein by a query are the same. In certain embodiments, a deep convolutional neural network, described in greater detail herein, is implemented to identify and analyze implicit temporal features 312 of an associated document.

In various embodiments, the mined data content 308 is then further processed to identify and analyze user context and preferences 314, which are in turn processed to generate associated temporal relevancy metrics 318. In certain of these embodiments, the resulting temporal relevancy metrics 318 may be modified to allow for personalization of retrieved results. In particular, the modifications may be performed to determine which document a user may consider temporally relevant for a given query. In one embodiment, the modifications are performed by analyzing a user's click-through rate (CTR), the amount of time the user spends interacting with the document, the number of pages navigated from that document by the user, and other temporal-relevance assertion features.

The mined data content 308 is then further processed in various embodiments to identify and analyzed content management policies 316, which are in turn processed to generate temporal relevancy metrics 318. In certain embodiments, the resulting temporal relevancy metrics 318 are used to identify particular time intervals and usage trends in user activity. As an example, temporal relevancy metrics 318 related to various content management policies 316 may allow a retailer to better understand when traffic on their website surges and dips.

From the foregoing, it will be appreciated that such temporal relevancy metrics 318 is useful for web analytics, as it provides insight to temporal trends related to both documents and associated website traffic. Likewise, the resulting temporal relevancy metrics 318 not only improves the likelihood of users gaining access to temporally-relevant content, but also provides a temporally-relevant timeline of user activity associated with a given document. Furthermore, such temporal relevancy metrics 318 can also be used to provide validation as to whether various usage trends met expectations.

From the foregoing, skilled practitioners of the art will recognize that a complex interaction exists between content dynamics and document retrieval algorithms. Consequently, an understanding of this interaction, as well as the cyclical patterns in query volumes and the relationship between query and document dynamics, is useful when attempting to preserve temporal relevance of answers to an associated query. Accordingly, various embodiments of the invention provide a novel approach for dynamic document retrieval that allows for differential weighting of content based upon the temporal characteristics of the document content. In certain embodiments, the system utilizes a vector of term frequencies, which defines functions accordingly when dealing with documents over time, instead of just applying a single term frequency for every word in the document. Likewise, analysis of document dynamics, as described in greater detail herein, is advantageously implemented in various embodiments to realize improved relevance ranking, especially as it applies to temporal relevancy.

Figure 4:
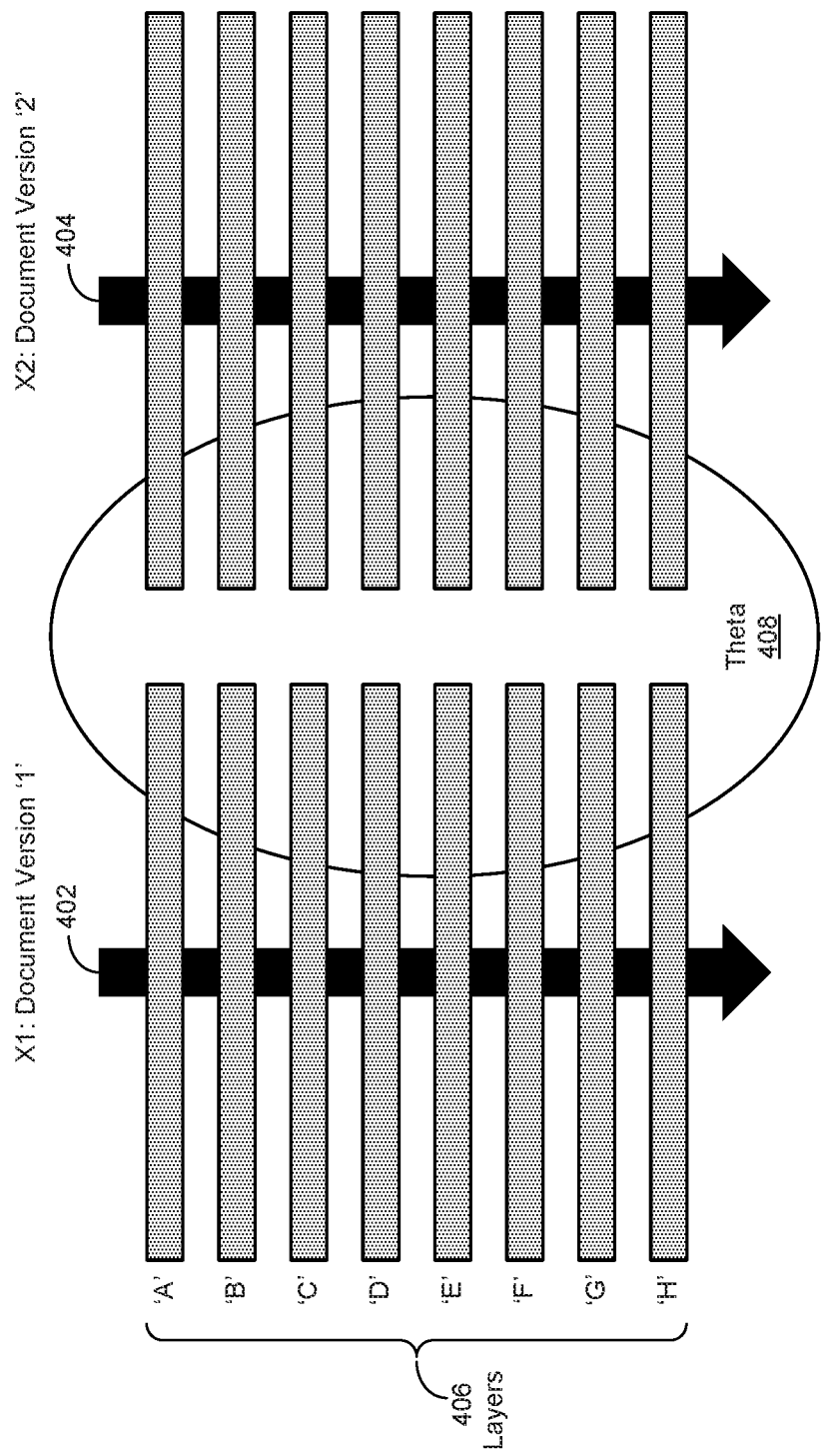
FIG. 4 is a simplified block diagram of a Siamese convolutional neural network implemented for preserving temporal relevance.

FIG. 4 is a simplified block diagram of a Siamese convolutional neural network (CNN) implemented in accordance with an embodiment of the invention for preserving temporal relevance. Skilled practitioners of the art will be familiar with CNNs, whose connectivity pattern is inspired by biological processes, which typically use minimal amounts of preprocessing. As such, their implementation has been shown to be effective in various natural language processing (NLP) operations, such as semantic parsing, search query retrieval, sentence modeling, classification, prediction, and other traditional NLP tasks.

Those of skill in the art will also be familiar with Siamese CNNs, which are typically implemented as a horizontal concatenation of two identical CNNs, as shown in FIG. 4, that accept twin inputs, such as a first version 402 of a document and second version 404 of a document. In certain embodiments, the twin inputs include various temporal features of the first version 402 and second version 404 of the two documents, represented by layers 406, which in turn have shared parameters represented by theta 408. In various embodiments, the layers 406 corresponding to the first version 402 and second version 404 of the two documents are used to train theta 408 through the implementation of a temporal coherence regularizer.

In these embodiments, losses are minimized and estimations of time ranges a document will be valid are improved, thereby providing a more accurate approximation of temporal relevancy than can typically be realized from document metadata. As an example, a document that does not have any explicit temporal characteristics can be analyzed by the Siamese CNN to realize an improved internal representation of the document. More particularly, the Siamese CNN identifies correlations of past states between the first version 402 and second version 404 of the two documents through the use of adaptive delayed links. In certain embodiments, implementation of the Siamese CNN shown in FIG. 4 not only preserves translations in consecutive frames and advantageously utilizes temporal coherence, but identifies temporal sequences of interest in the document as well. Accordingly, implementation of a Siamese CNN allows temporal characteristics of the document to be determined, which in turn can be used to predict implicit time ranges that a document is temporally relevant in without the need for human annotation.

Figure 5:
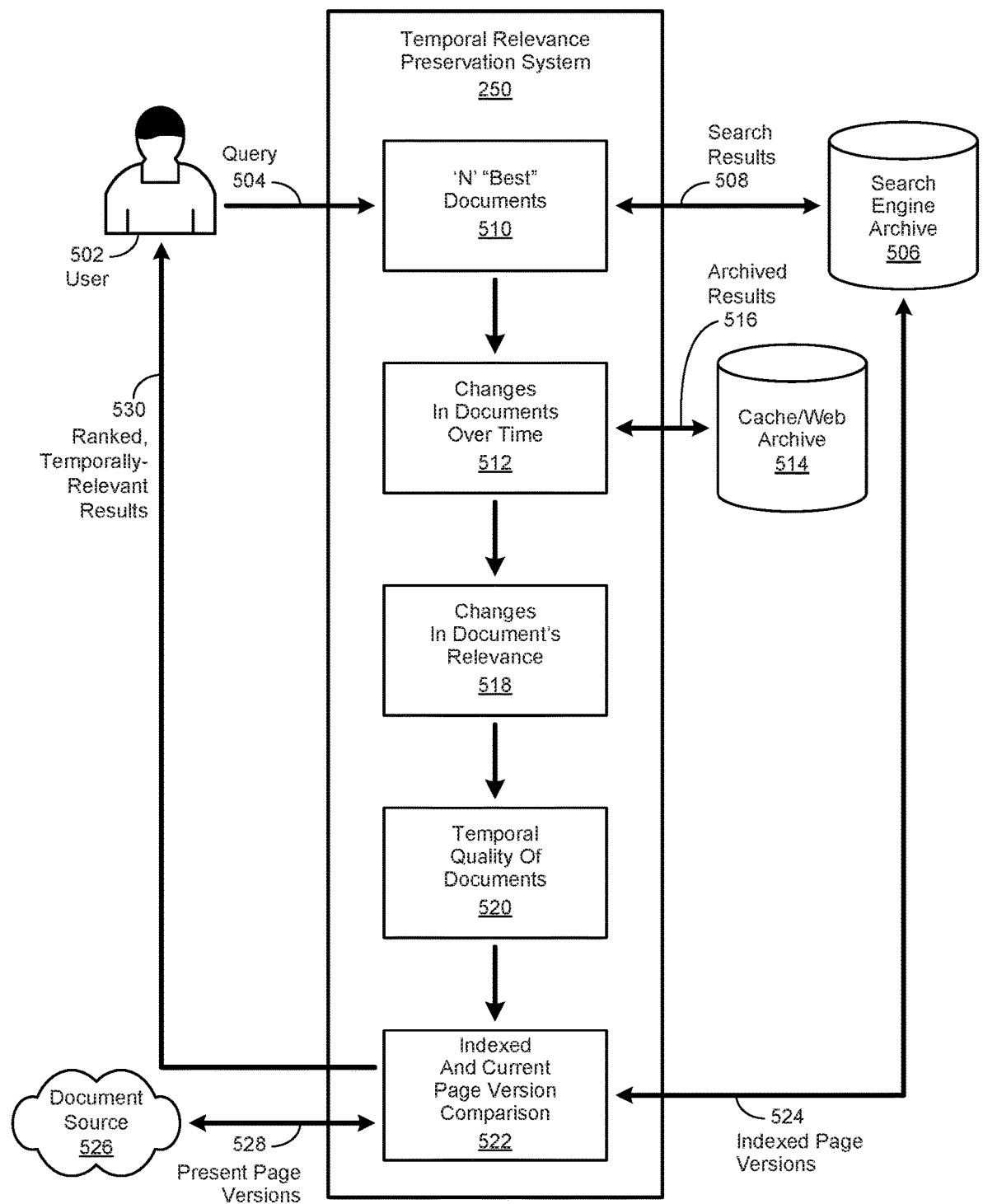
FIG. 5 is a simplified process flow diagram showing the operation of a temporal relevance preservation system.

FIG. 5 is a simplified process flow diagram showing the operation of a temporal relevance preservation system implemented in accordance with an embodiment of the invention. In this embodiment, a user 502 submits a query 504 containing temporal features, as described in greater detail herein, to a temporal relevance preservation system 250. The temporal relevance preservation system 250, which in various embodiments is implemented in combination with a query-answer (QA) system, likewise described in greater detail herein, processes the query 504 to identify the temporal features it contains. In turn, the temporal features are used, as described in greater detail herein to search a search engine archive 506, which returns search results 508.

The query 504 is then further processed with the search results 508 to identify 'N' best documents 510 within the search results 508. The resulting 'N' best documents 510 are then processed to retrieve associated web browser cache history and document metadata from a cache/web archive 514. The archived results 516 are then processed with the 'N' best documents 510 to determine changes that have occurred in the documents over time 512.

Data associated with the changes that have occurred in the documents over time 512 is then processed to determine data associated with changes in each document's relevance 518, which in turn is processed to determine, described in greater detail herein, the temporal quality of each of the documents 520. The search engine archive 506 is then accessed once again to retrieve indexed page versions 524 of the previously-processed 'N' best documents 510. The document source 526 (e.g., the World Wide Web) of the 'N' best documents 510 is then accessed to retrieve their respective present page versions 528. The indexed page versions 524 and the present page versions 528 are then processed to generate an indexed and current page version comparison 522, which in turn is processed to generate a ranked list of temporally-relevant results 530, which is then provided to the user 502.

Figure 6:
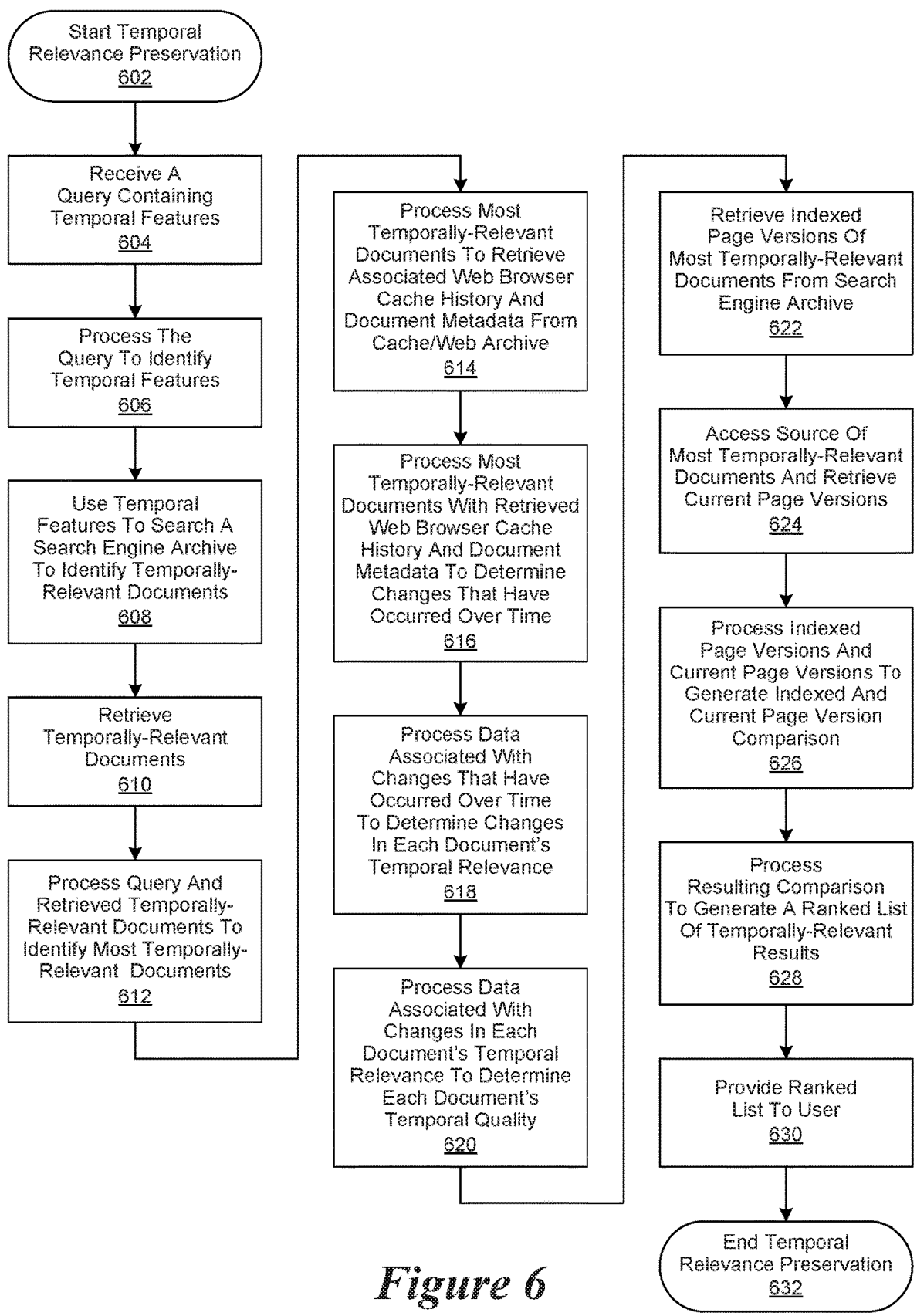
FIG. 6 is a generalized flowchart of the performance of temporal relevance preservation operations.

FIG. 6 is a generalized flowchart of the performance of temporal relevance preservation operations implemented in accordance with an embodiment of the invention. In this embodiment, temporal relevance preservation operations are begun in step 602, followed by the receipt of a query containing temporal features, as described in greater detail herein, by a temporal relevance preservation system in step 604. The temporal relevance preservation system, which in various embodiments is implemented in combination with a query-answer (QA) system, likewise described in greater detail herein, processes the query in step 606 to identify the temporal features it contains. In turn, the temporal features are used, as described in greater detail herein to search a search engine archive in step 608, which results in the retrieval of temporally-relevant documents in step 610.

The query is then further processed in step 612 with the retrieved, temporally-relevant documents, to identify those that are most temporally-relevant to the query. The most temporally-relevant documents are then processed in step 614 to retrieve associated web browser cache history and document metadata from a cache/web archive. The most temporally-relevant documents are then processed in step 616 with the retrieved web browser cache history and document metadata to determine to determine changes that have occurred in the documents over time.

Data associated with the changes that have occurred in the documents over time is then processed in step 618 to determine data associated with changes in each document's temporal relevance, which in turn is processed in step 620, as described in greater detail herein, to determine the temporal quality of each of the documents. The search engine archive is then accessed once again in step 622 to retrieve indexed page versions of the most temporally-relevant documents. The document source (e.g., the World Wide Web) of the most temporally-relevant documents is then accessed in step 624 to retrieve their respective present page versions. The resulting indexed page versions and the present page versions are then processed in step 626 to generate an indexed and current page version comparison, which is then processed in step 628 to generate a ranked list of temporally-relevant results. In turn, the resulting ranked list of temporally-relevant results is then provided to the user in step 630 and temporal relevance preservation operations are ended in step 632.

Although the present invention has been described in detail, it should be understood that various changes, substitutions and alterations can be made hereto without departing from the spirit and scope of the invention as defined by the appended claims.

What is claimed is:

1. A computer-implemented method for preserving temporal relevance of content within a corpus, comprising:
processing a corpus of documents to generate temporally-relevant metadata and mined content associated with documents in the corpus of documents;
identifying explicit temporal features and implicit temporal features from the mined content;
processing the temporally-relevant metadata and the mined content to generate first temporal relevancy metrics, wherein the processing comprises processing the explicit temporal features and the implicit temporal features;
processing a cache history of a web browser to generate second temporal relevancy metrics, wherein the processing comprises analyzing content of the cache history of the web browser to provide a reference history for the documents in terms of reference frequency and likelihood of being referenced and generating the second temporal relevancy metrics based on the reference frequency and the likelihood of being referenced in the reference history;
processing the first and the second temporal relevancy metrics to generate first temporal relevancy ranking scores for the documents in the corpus of documents, wherein the first temporal relevancy ranking scores provides a measure of temporal relevance for each of the documents in the corpus of documents
updating the corpus of documents by ingesting new documents into the corpus of documents and revising existing documents in the corpus of documents;
processing temporally-relevant metadata and mined content associated with the new documents and revisions to the existing documents to generate third temporal relevancy metrics; and
processing the second and the third temporal relevancy metrics to generate second temporal relevancy ranking scores for the documents in the corpus of documents, wherein the processing comprises generating temporal relevancy ranking scores for the ingested new documents and revising the first temporal relevancy ranking scores associated with the existing documents to reflect their respective temporal relevance.

2. The method of claim 1, further comprising:
using the second temporal relevancy scores to provide a temporally-relevant response to a query, the response having a temporal feature corresponding to a temporal feature in the query.

3. The method of claim 1, wherein the mined content associated with the documents in the corpus of documents comprises:
user context and preferences; and
content management processes.

4. The method of claim 1, wherein:
the processing of the second and the third temporal relevancy metrics comprises applying differential weighting to individual terms within the corpus of documents according to temporal features associated with the individual terms.

5. A system comprising:
a processor;
a data bus coupled to the processor; and
a computer-usable medium embodying computer program code, the computer-usable medium being coupled to the data bus, the computer program code used for preserving temporal relevance of content within a corpus and comprising instructions executable by the processor and configured for:
processing a corpus of documents to generate temporally-relevant metadata and mined content associated with documents in the corpus of documents;
identifying explicit temporal features and implicit temporal features from the mined content;
processing the temporally-relevant metadata and the mined content to generate first temporal relevancy metrics, wherein the processing comprises processing the explicit temporal features and the implicit temporal features;

processing a cache history of a web browser to generate second temporal relevancy metrics, wherein the processing comprises analyzing content of the cache history of the web browser to provide a reference history for the documents in terms of reference frequency and likelihood of being referenced and generating the second temporal relevancy metrics based on the reference frequency and the likelihood of being referenced in the reference history;

processing the first and the second temporal relevancy metrics to generate first temporal relevancy ranking scores for the documents in the corpus of documents, wherein the first temporal relevancy ranking scores provide a measure of temporal relevance for each of the documents in the corpus of documents updating the corpus of documents by ingesting new documents into the corpus of documents and revising existing documents in the corpus of documents;

processing temporally-relevant metadata and mined content associated with the new documents and revisions to the existing documents to generate third temporal relevancy metrics; and processing the second and the third temporal relevancy metrics to generate second temporal relevancy ranking scores for the documents in the corpus of documents, wherein the processing comprises generating temporal relevancy ranking scores for the ingested new documents and revising the first temporal relevancy ranking scores associated with the existing documents to reflect their respective temporal relevance.

6. The system of claim 5, further comprising:
using the second temporal relevancy scores to provide a temporally-relevant response to a query, the response having a temporal feature corresponding to a temporal feature in the query.

7. The system of claim 5, wherein the mined content associated with the documents in the corpus of documents comprises:
user context and preferences; and
content management processes.

8. The system of claim 5, wherein:
the processing of the second and the third temporal relevancy metrics comprises applying differential weighting to individual terms within the corpus of documents according to temporal features associated with the individual terms.

9. A non-transitory, computer-readable storage medium embodying computer program code, the computer program code comprising computer executable instructions configured for:
processing a corpus of documents to generate temporally-relevant metadata and mined content associated with documents in the corpus of documents;
identifying explicit temporal features and implicit temporal features from the mined content;
processing the temporally-relevant metadata and the mined content to generate first temporal relevancy metrics wherein the processing comprises processing the explicit temporal features and the implicit temporal features;

processing a cache history of a web browser to generate second temporal relevancy metrics, wherein the processing comprises analyzing content of the cache history of the web browser to provide a reference history for the documents, in terms of reference frequency and likelihood of being referenced and generating the second temporal relevancy metrics based on the reference frequency and the likelihood of being referenced in the reference history;

processing the first and the second temporal relevancy metrics to generate first temporal relevancy ranking scores for the documents in the corpus of documents, wherein the first temporal relevancy ranking scores provide a measure of temporal relevance for each of the documents in the corpus of documents updating the corpus of documents by ingesting new documents into the corpus of documents and revising existing documents in the corpus of documents;

processing temporally-relevant metadata and mined content associated with the new documents and revisions to the existing documents to generate third temporal relevancy metrics; and processing the second and the third temporal relevancy metrics to generate second temporal relevancy ranking scores for the documents in the corpus of documents, wherein the processing comprises generating temporal relevancy ranking scores for the ingested new documents and revising the first temporal relevancy ranking scores associated with the existing documents to reflect their respective temporal relevance.

10. The non-transitory, computer-readable storage medium of claim 9, further comprising:
using the second temporal relevancy scores to provide a temporally-relevant response to a query, the response having a temporal feature corresponding to a temporal feature in the query.

11. The non-transitory, computer-readable storage medium of claim 9, wherein the mined content associated with the documents in the corpus of documents comprises:
user context and preferences; and
content management processes.

12. The non-transitory, computer-readable storage medium of claim 9, wherein:
the processing of the second and the third temporal relevancy metrics comprises applying differential weighting to individual terms within the corpus of documents according to temporal features associated with the individual terms.

13. The non-transitory, computer-readable storage medium of claim 9, wherein the computer executable instructions are deployable to a client system from a server system at a remote location.

14. The non-transitory, computer-readable storage medium of claim 9, wherein the computer executable instructions are provided by a service provider to a user on an on-demand basis.

* * * * *